Nov. 25, 1941.  S. K. WELLMAN  2,264,192
CUSHIONED FRICTION CLUTCH
Filed Sept. 29, 1939
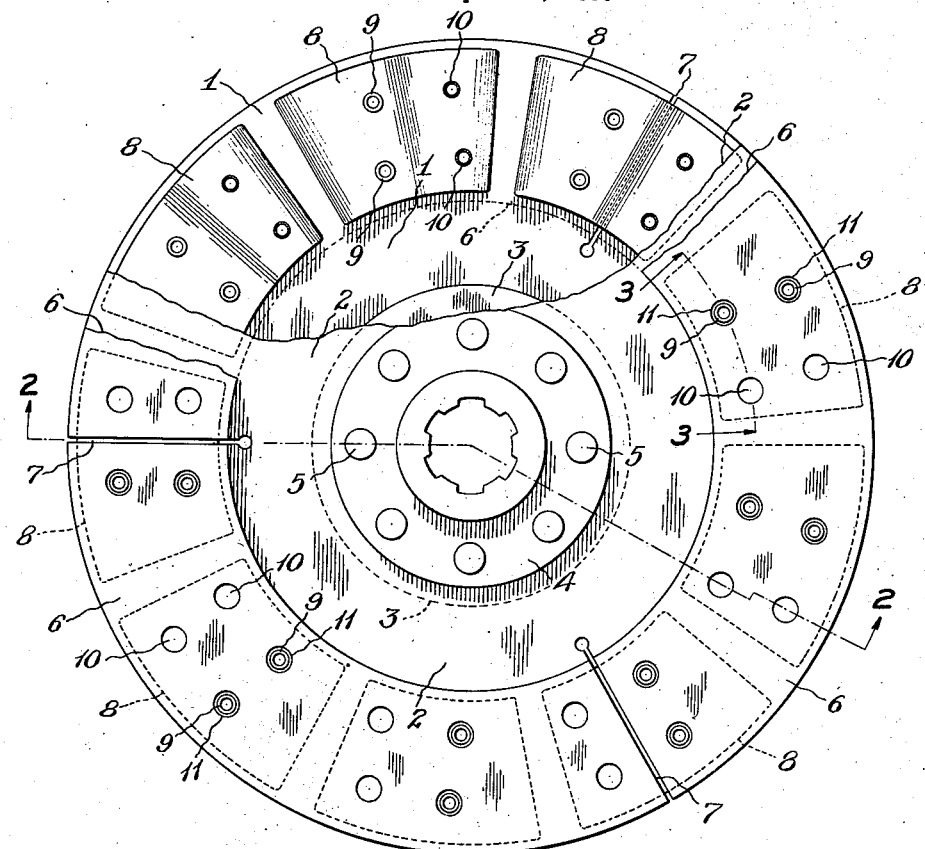
FIG. 1.
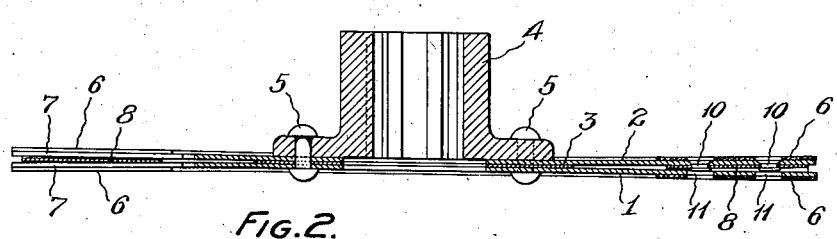
FIG. 2.
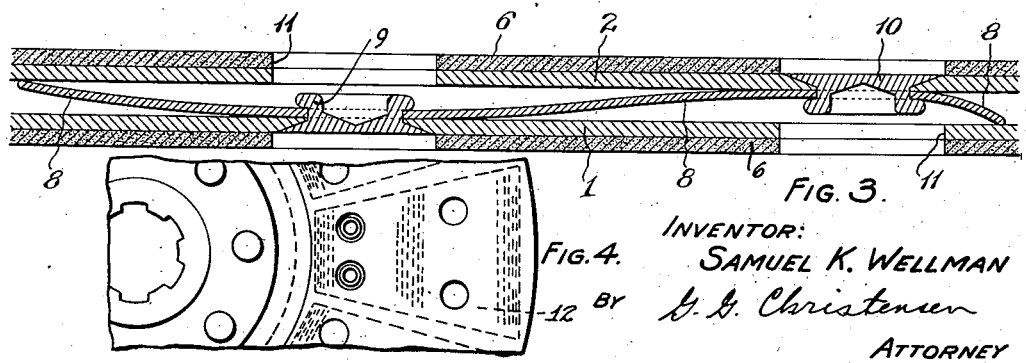
FIG. 3.
FIG. 4.
INVENTOR:
SAMUEL K. WELLMAN
BY G. G. Christensen
ATTORNEY Patented Nov. 25, 1941

2,264,192

UNITED STATES PATENT OFFICE 2,264,192

CUSHIONED FRICTION CLUTCH

Samuel K. Wellman, Cleveland Heights, Ohio, assignor to The S. K. Wellman Company, Cleveland, Ohio, a corporation of Ohio Application September 29, 1939, Serial No. 297,066

2 Claims. (Cl. 192—107)

This invention relates to a cushioned clutch plate for friction clutches of the kind wherein the clutch plate is disposed between a pair of co-operating pressure plates and is adapted to be gripped or clamped therebetween under sufficient pressure to transmit power between the pressure plates and the hub of the clutch plate. The invention relates particularly to a cushioned clutch plate of the all metal type which utilizes sintered-metal friction facing material.

An object of the invention is to provide a cushioned clutch plate in which the cushioning elements are not relied upon to transmit power between the driving and driven parts of the clutch. Another object is to provide a clutch plate in which both friction facing layers are effectively cushioned over their entire area so as to make full engagement with the pressure plates throughout the application of pressure thereby.

Another object is to provide a clutch plate in which each portion of the friction facing layers is positively and rigidly coupled to the hub member thru its own supporting disc.

Another object is to provide a light weight clutch plate of the all-metal type in which the friction facing layers are each integrally united to separate driving discs.

Another object is to provide a cushioned clutch using cushioned elements which are effective in restraining axial separation of the clutch facings.

Other objects will appear in the following description taken in connection with the accompanying drawing.

In the drawing:

Fig. 1 is a plan view of a clutch plate embodying the invention, portions being broken away to expose interior features.

Fig. 2 is a sectional view taken on the line 2—2 of Fig. 1.

Fig. 3 is an enlarged sectional view taken on the line 3—3 of Fig. 1.

Fig. 4 is a partial plan view of a modified construction which embodies the invention.

A clutch plate as constructed in accordance with this invention comprises a pair of relatively thin sheet metal discs 1 and 2 disposed in axial alignment and spaced apart at their central portions by a spacer ring 3, the discs and spacer ring being secured to a suitable hub member 4 in any convenient manner, such as by means of rivets 5.

The remote faces of the discs are each provided with a facing ring of friction material 6, 6. Any suitable friction material may be used but a friction composition of the sintered-metal type is particularly preferred since such a material may be integrally bonded to the discs 1 and 2, thereby avoiding the use of rivets and making it possible to use the entire thickness of facing material. A desirable sintered-metal friction composition is disclosed in my U. S. Patent No. 2,178,527, issued October 31, 1939, the composition being disclosed in connection with a method for integrally bonding it to metal backing members such as discs 1 and 2. It will be understood that various methods may be used for producing such an integral bond, but the method described in the above mentioned application is preferred since the bond produced by that method is exceptionally strong and in addition is very resistant to temperature, permitting a clutch plate of the type there described to be operated for prolonged periods of time at temperatures approaching 1000° F.

The discs 1 and 2 are preferably slotted as shown at 7, to provide greater peripheral flexibility in both the axial and circumferential directions, and to accommodate thermal expansion and contraction of the discs, but it will be apparent that the slots may be omitted without altering the basic features of the invention.

The peripheral portions of the faced discs are cushioned by a plurality of segmental sheet metal springs 8, 8 disposed between the discs. The springs are corrugated radially so as to have an S-shaped cross-section as shown in Fig. 3; that is, the corrugations are such as to provide a convexly curved portion contiguous to a concave portion. The ends of the springs are bent so that an end thereof and the apex of one of the curved portions define a plane which lies parallel to the plane defined by the opposite end and apex of the other curved portion. When bent in this manner the spring contacts each disc along two elements, one element being at the apex of a curved portion, the other being at the end of the spring which is remote therefrom.

The springs are each fastened at their curved portions to both the discs; for example, one set of rivets 9, 9 may secure the concave portion of the spring to disc 1 while a second set of rivets 10, 10 secure the convex portion to disc 2. The outer heads of the rivets are preferably countersunk into the discs so that they will be entirely below the facing layer. Since the inner heads project beyond the springs and would prevent the springs from being squeezed flat, registering openings 11, 11 are provided in each disc opposite the rivets, each opening being large enough to receive the upset end of the opposed rivet. Preferably, the openings extend through the facing layer also to permit a riveting tool to be inserted therethrough.

It will be observed that a clutch plate constructed to involve the features disclosed above will have both of its friction facing layers cushioned against axial motion relative to the other, and both will be cushioned over substantially their whole surface. By reason of this construction, each facing layer will contact the opposing pressure plates over its whole area, and whatever wear occurs will be distributed evenly over the surface of the facing material. In addition, the cushioning provides smoother engagement between the clutch plate and the pressure plates and avoids chattering and grabbing. Furthermore if the pressure plates are not perfectly plane, or parallel to the plane of the facing material, the cushioning permits each facing layer to become warped independently of the other so as to accommodate itself to the warped surface of the contacting pressure plate. When the clutch is in full engagement, the facing material will consequently make contact over its whole surface and therefore transmit its full quota of power.

It will also be apparent that the form of the cushion elements together with the manner in which they are secured to opposite discs permits the cushion elements to flex inwardly when the discs are compressed together, but restrains the discs against axial separation beyond a predetermined amount, such as may otherwise tend to occur when the clutch is quickly released. The axial restraint thus imposed permits free release of the pressure plates and avoids wear of the friction material resulting from incomplete release.

A clutch plate of the above construction also has an advantage in the fact that no rivets are employed in securing the facing material to the supporting discs. The entire thickness of facing material may therefore be worn away without danger of rivet heads scoring or gouging the pressure plates. Long life may thereby be obtained with a thin layer of facing material, while the thinner layer in turn provides lighter weight. Still another advantage exists in the fact that each friction facing layer is independently supported on a separate driving disc. Each layer is therefore positively coupled to the hub member, and power is transmitted thru the clutch plate without passing thru the cushioning elements. Greater torsional rigidity results with a corresponding reduction in torsional vibration of the clutch plates relative to one another. In addition, since the cushioning elements are not relied upon to transmit power, they may be designed solely to provide the cushioning action which is desired without regard to the power quota of the clutch, and thereby be made to provide a free cushion action over any portion of the range of axial pressures applied to the clutch.

Various modifications of the structures will occur to those skilled in the art. For example, while spacer ring 3 is preferably of the same thickness as springs 8, 8, it may be made either thicker or thinner. Furthermore, where an especially wide facing layer is employed, it may be desirable to turn the cushioning springs half way around so that their length extends radially instead of circumferentially. This modification is illustrated in Fig. 4. In this modification the corrugations of the springs 12 extend circumferentially, but the convex and concave portions thereof are secured to opposite driving discs, as in the construction of Figs. 1–3. It will be obvious that spot-welding can be substituted for the rivets 9 and 10, this substitution being possible by reason of the fact that the cushion elements are not relied upon to transmit torsional forces and hence are subjected to small forces.

Having now disclosed the invention, what I claim is:

1. A cushioned clutch plate assembly in which the frictional facing material may be wholly worn away before replacement is required, said assembly comprising: a pair of axially aligned sheet metal discs spaced apart and having friction facing material secured to the remote faces thereof solely by means of a bond which is substantially coextensive with the mutually contacting surfaces of said facing material and said discs; means for resiliently impelling the peripheries of said discs apart and for restraining said discs from excessive axial separation, said means comprising a plurality of reversely curved sheet metal springs each of which has a concave portion contiguous to a convex portion, each of said springs being disposed between registering peripheral portions of said discs and secured at its concave portion to one disc and at its convex portion to the other by fastening means which lie wholly between the said remote faces of said discs when said springs have been flattened by axial compression of one disc toward the other; and means for unitarily coupling said discs to each other to prevent the transmission of torsional forces through said springs from one disc to the other when the assembly is in use.

2. A cushioned clutch plate assembly in which the frictional facing material may be wholly worn away before replacement is required, said assembly comprising: a pair of axially aligned sheet metal discs spaced apart and having friction facing material secured to the remote faces thereof solely by means of a bond which is substantially coextensive with the mutually contacting surfaces of said facing material and said discs; means for resiliently impelling the peripheries of said discs apart and for restraining said discs from excessive axial separation, said means comprising a plurality of reversely curved sheet metal springs each of which has a concave portion contiguous to a convex portion, each of said springs being disposed between registering peripheral portions of said discs and welded at its concave portion to one disc and at its convex portion to the other whereby said springs are secured to said discs by fastening means which lie wholly between the said remote faces of said discs when said springs have been flattened by axial compression of one disc toward the other; and means for unitarily coupling said discs to each other to prevent the transmission of torsional forces through said springs from one disc to the other when the assembly is in use.

SAMUEL K. WELLMAN.